Figure 1:
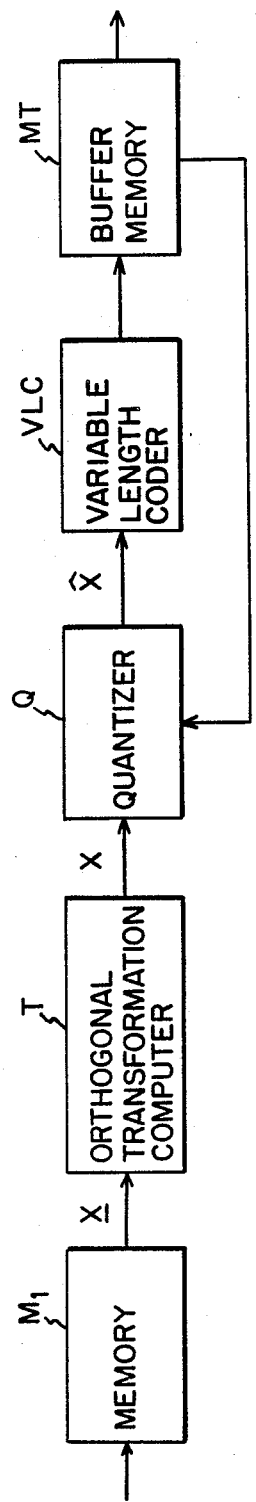

United States Patent [19]

Delogne et al.

[11] Patent Number: 4,894,713
[45] Date of Patent: Jan. 16, 1990

[54] METHOD OF CODING VIDEO SIGNALS

[75] Inventors: Paul Delogne, Limelette; Benoît Macq, Brussels; Luc Vandendorpe, Dottignies, all of Belgium

[73] Assignee: The Belgian State, Brussels, Belgium

[21] Appl. No.: 200,933

[22] Filed: Jun. 1, 1988

[30] Foreign Application Priority Data

Jun. 5, 1987 [BE] Belgium .................. 8700623

[51] Int. Cl.⁴ ............... H04N 7/133; H04N 7/137
[52] U.S. Cl. ................... 358/133; 358/135; 358/136; 364/725
[58] Field of Search ........... 358/133, 135, 136, 138; 364/725

[56] References Cited

U.S. PATENT DOCUMENTS

| | | | |
|---|---|---|---|
| 4,447,886 | 5/1984 | Meeker | 364/725 |
| 4,541,012 | 9/1985 | Tescher | 358/133 |
| 4,707,738 | 11/1987 | Ferre | 358/135 |
| 4,751,742 | 6/1988 | Meeker | 358/133 |

FOREIGN PATENT DOCUMENTS 0189703 8/1986 European Pat. Off. .

OTHER PUBLICATIONS

"A Visual Model Weighted Cosine Transform for Image Compression and Quality Assessment", IEEE Transactions on Communications, vol. Com-33, No. 6. Jun. 1985, pp. 551-557.

"A Visually Weighted Quantization Scheme for Image Bandwidth Compression at Low Data Rates", IEEE Transactions on Communications, vol. Com-34, No. 8, Aug. 1986, pp. 840-847.

"Picture Quality Prediction Based on a Visual Model", IEEE Transactions on Communications, vol. Com-30, No. 7, Jul. 1982, pp. 1679-1692.

Primary Examiner—Howard W. Britton
Attorney, Agent, or Firm—Kramer, Brufsky & Cifelli

[57] ABSTRACT

In a method in which the data related to the image are read in successive blocks, then subjected to orthogonal transformation, the coefficients of the transform obtained being quantized and analyzed according to a certain order and applied in the form of binary signals to a redundancy reducing coder, the signals representing the coefficients of the transform are stored in a memory organized in several blocks, and the contents of said memory are analyzed such that the signals applied to the redundancy reducing coder comprise sets of signals of coefficients taken from a group of blocks, the signals of each coefficient in each set being taken from a separate block belonging to said group of blocks.

10 Claims, 5 Drawing Sheets

METHOD OF CODING VIDEO SIGNALS

The present invention concerns methods of coding video signals for the transmission and digital storage of visual data, especially fixed images or television signals, and more particularly, it concerns improvements to these methods for the purpose of obtaining high coding efficiency independently of the image statistics, and making full use of the properties of human vision.

Digital coding of visual data requires a large number of bits per image, in other words, in the case of a sequence of images, a high bit rate. This rate can be greatly reduced because, from a statistical point of view, there is a strong correlation between the elements of a piece of visual information. This correlation, which is also known as redundancy, exists between the elements of a single image and between the elements of successive images.

Several methods of coding are known which permit reduction of the bit rate, based on the construction of a series of decorrelated data. These methods can be loosely classified into three catagories.

In predictive methods, the value of the image element to be transmitted (so-called current element) is predicted from the value of the previously transmitted image elements, or more exactly, from an approximate value of these elements, then the predictive error is quantized, and a corresponding code is then transmitted. Since the prediction is made from an approximate value of the preceding elements, and since this approximate value is itself made up of quantized predictive errors, the receiving end is completely capable of structuring that prediction. By correcting the latter by the predictive error that is transmitted to it, the receiving end is thus able to calculate the value of the current image element, except for the quantizing error. The prediction of the current image element can be based either on the preceding elements from the same line, or on the preceding elements from the same frame, or on the elements of two or more preceding frames. The latter case makes it possible to incorporate into the prediction algorithms, advanced techniques, such as the prediction or compensation of movement.

A second category of coding methods comprises the transform methods. In these processes, a certain number of adjacent elements of the image are assembled in a partial image called a block. This block can be one-dimensional, if it consists of image elements taken from a single line; two-dimensional, if it consists of elements taken from a rectangular zone of a frame; or three-dimensional, if it consists of elements taken from a rectangular zone and a certain number of successive frames. The next step consists in applying to the elements of the block a linear mathematicla transformation producing parameters that are ideally decorrelated, and called transformed coefficients. From a mathematical viewpoint, if x is the matrix made up of image elements belonging to the block, we construct a matrix of transformed coefficients X by a relation of the type $X=Tx$ (T being a linear operator).

In the case of one-dimensional blocks, this operator is represented by a matrix. In the case of two- or three-dimensional blocks, the operator is generally a tensor; however, in practice, we are limited to one-dimensional transformations applied in succession along two or three dimensions. The ideal transform, which produces completely decorrelated transformed coefficients, is the Karhuhnen-Loeve transform. However, the latter is inapplicable in practice, because its use assumes that the correlative properties of the images are well determined and well known.

In practice, along the three axes, unitary matrix transformations are used which provide good decorrelation properties, and especially, the discrete Fourier transform (DFT), the Hadamard transform (HT), the discrete cosine transform (DCT), etc. Among all of these transforms, the DCT is the one which has the best decorrelation properties, and it is the most widely used in image coding. A well-known property of unitary transformations is energy conservation: the sum of the variances of the transformed coefficients is equal to that of the image elements. Thus, if the transformed coefficients are ranked in increasing order, the high order coefficients have amplitudes which are statistically small, and require few bits in order to be transmitted. There are different known manners of making use of this property, especially threshold coding, coding by zones, variable-length coding, etc.

The third category of processes makes use of hybrid coding. This is a combination of the processes in the first two categories, in the sense that an algorithm of the predictive type is applied to the coefficients of a transform.

This invention concerns improvments to coding processes belonging to the second and third category. In most known prior methods, the coefficients of the transform are quantized with the same quantizing step, regardless of their order, and this step can be adapted, either as a function of the contents of the scene, or in order to regulate the bit rate according to the status of a buffer memory, or in order to assign to an image a predetermined number of bits. In these known methods, the bit rate reduction is based exclusively on the intrinsic redundancy of the images, and the redundancy reduction is obtained by taking the transformed coefficients block by block and applying to them a redundancy reducing code determined as a function of the mean statistical properties of the images.

The subject of the invention is a scanning technique which consists of no longer applying the redundancy reducing coding to the transformed coefficients of each block taken separately, but to sets of transformed coefficients of the same order taken in groups of blocks, or even in sets of bits of the same significance belonging to transformed coefficients of the same order taken in groups of blocks. This scanning technique can be used in relation with a unitary transformation, which is known in itself, or with a corresponding so-called perceptive transformation; in the latter case, the scanning takes advantage of the properties of the perceptive transform because it corresponds to a progressively increasing quality of the coded image.

The so-called perceptive transformation can be applied to blocks of video images taken in a single frame or in different frames of an image, or it can be applied to the predictive error determined in a known manner in a hybrid coder.

Figure 2:
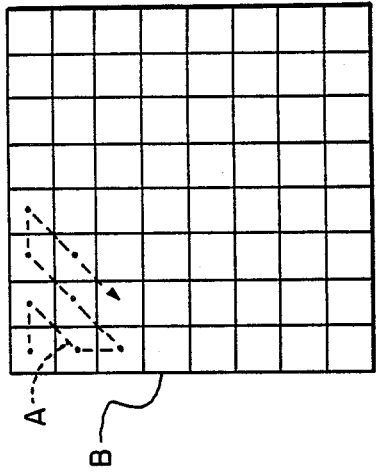
Figure 3:
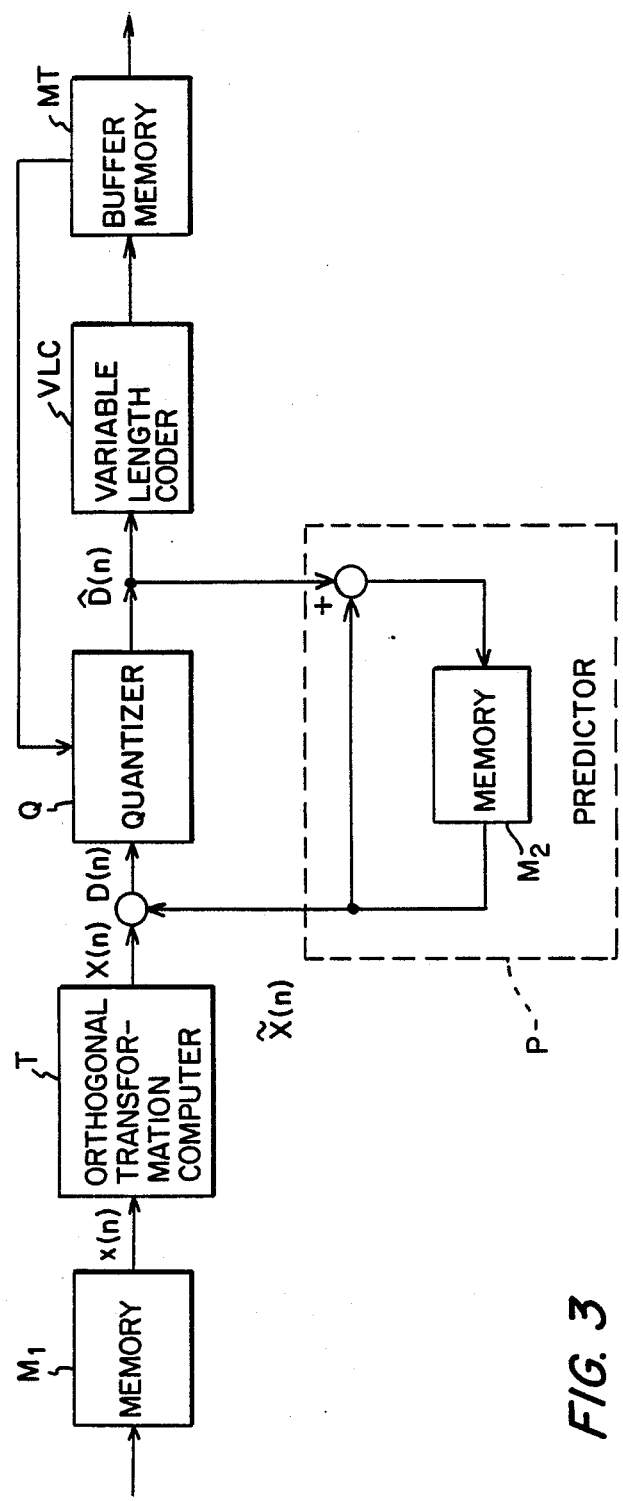
Figure 4:
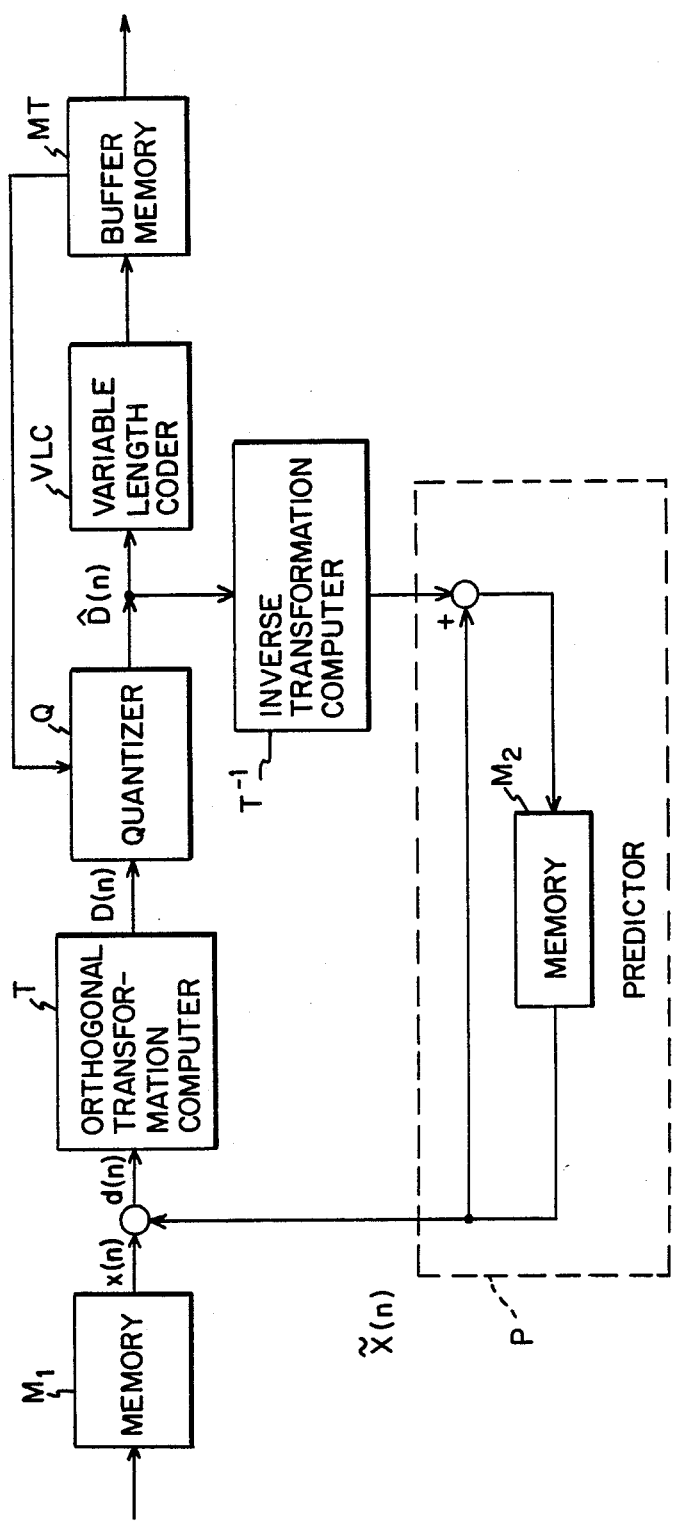
Figure 5:
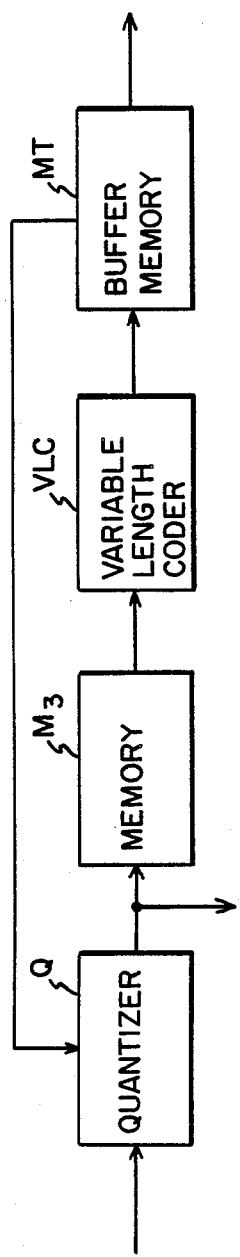
Figure 6:
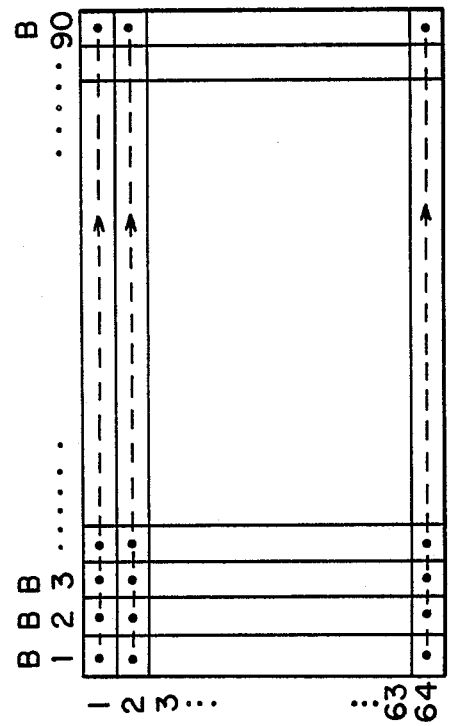
Figure 7:
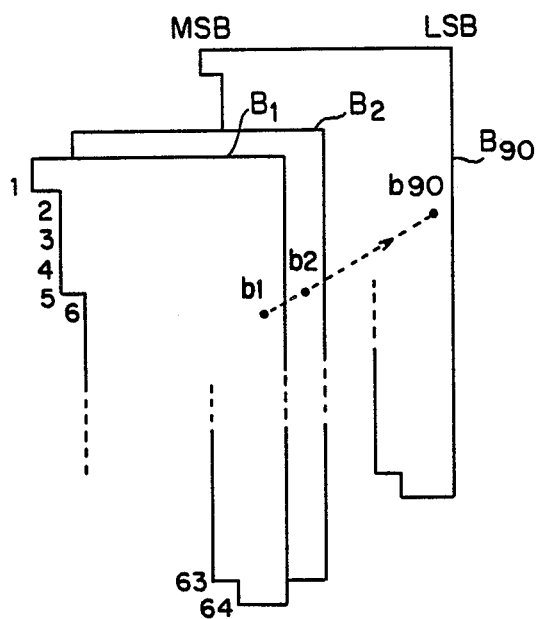

The invention is described in detail in the following text using the attached drawings wherein:

FIG. 1 shows the general diagram of a block by block redundancy reducing intra-frame coder, FIG. 2 illustrates the scanning path of a block of image elements for the purpose of block by block redundancy reducing coding, FIG. 3 is a diagram of a hybrid coder with prediction in the transformed field and block by block redundancy reduction, FIG. 4 is a diagram of a hybrid coder with prediction in the original field and redundancy reduction by block, FIG. 5 shows a modification of the diagrams in FIGS. 2 3 and 4 according to another aspect of the invention, FIG. 6 illustrates one possible scanning path for the contents of the memory represented in FIG. 5, FIG. 7 illustrates an analysis of the bits contained in the memory represented in FIG. 5.

The following text is limited to a description of the processing of the luminance component of the video signal. For color images, it should be considered that the two color difference signals are subject to analog processing.

Referring to FIG. 1, we can see a symbolic representation of the organization of an intra-frame two-dimensional transform coder, with block to block redundancy reducing coding. Although the transform operates on rectangular blocks having a dimension of $N_1$ points in the vertical direction and $N_2$ points in the horizontal direction, the elements of the image related to $N_1$ successive lines are first accumulated in a memory $M_1$. The image elements are then read by successive blocks. In FIG. 1, x designates a block of image elements. The orthogonal transformation computer T determines the transform X and the elements of the matrix are then presented to a quantizer Q. At the output of the latter, we obtain a matrix of transformed and quantized coefficients noted $\hat{X}$. The transformed coefficients of the matrix $\hat{X}$ are the subject of redundancy reducing processing, which can be carried out in several known ways. In the version presented in FIG. 1, the elements of matrix $\hat{X}$ are processed in a variable length coder VLC, using, for example, a Huffman code. The resulting binary data is at a variable rate, as a function of the local contents of the image. It is stored in a buffer memory MT. This data is reread at a constant rate in a coder which must present a constant output bit rate. It is obviously suitable to prevent the buffer memory from being either completely empty or completely full. In order to do this, an MT buffer memory filling status measuring device acts by feedback on the quantizer Q in order to reduce the quantizing step, if the buffer memory is likely to become empty, and to increase it in the opposite case. This is equivalent to reacting on a multiplicative coefficient or a standardizing coefficient, acting on the elements of matrix $\hat{X}$ and using a quantizer with a fixed quantizing step.

In order to increase the efficiency of the variable length coder, the elements of matrix $\hat{X}$ of the transformed coefficients are often presented to the VLC coder input in an order such as the one that is illustrated in FIG. 2. The gridded rectangle labeled B represents a block of image elements, and a transformed coefficient of the matrix $\hat{X}$ corresponds to each box. The dotted line labeled A shows the scanning path followed: it links the boxes scanned in succession to one another, and indicates the order in which the coefficients of matrix $\hat{X}$ are presented to the VLC coder input. The advantage of this scanning process is as follows: because of the redundancy of the image, the transformed coefficients have amplitudes, which, statistically, decrease with the order of the coefficient. With a scanning path like the one shown in FIG. 2, the order of the coefficients is increasing. As soon as high orders are reached, it becomes very probable that series of coefficients of null value will be encountered. These sequences can be coded very efficiently by assigning to them a code word indicating that a sequence of null coefficients is involved and giving its length.

In the diagram in FIG. 1, the transformation computer T, according to the prior art, is organized to calculate a unitary transform (DFT, DCT, HT, etc.), and the transformed coefficients are generally quantized with the same quantizing step, which can be adjusted as a function of the filling status of the buffer memory.

According to one aspect of the invention, the transformation computer T is organized to calculate a transform which is suitable as a function of the perceptive characteristics of the eye. This transform, which is no longer unitary as in the prior art, will be called a perceptive transform. The process of determining the perceptive transform will be described in detail below. The schematic diagram of the coder can be similar to the one in FIG. 1, but it is clear that the variable length code must be modified as a function of the statistical data of the transformed coefficients. Moreover, this statistical data can be such that it is preferable to use different scanning paths from the one shown in FIG. 2.

Perceptive transformation according to the invention can also be applied in an interframe hybrid coder with predictive coding. FIG. 3 shows the diagram of an interframe hybrid coder with prediction in the transformed field. Series of image elements relative to $N_1$ successive lines are accumulated in a memory $M_1$, and the latter is read by blocks measuring $N_1 \times N_2$. In FIG. 2, x(n) designates a block of image elements from the frame, and n designates the order of the frame. The transformation computer T determines the transform X(n). According to the invention, the applied transformation is a perceptive transformation. A predictive algorithm is then applied to the matrix X(n). In order to do this, this difference D(n) between X(n) and a prediction $\overline{X}(n)$ is constructed. This difference, or predictive error is quantized in the quantizer Q which produces the matrix $\hat{D}(n)$. According to the conventional art of predictive coding, the prediction $\overline{X}(n)$ is formed in a predictor P from the quantized predictive error $\hat{D}(n)$. FIG. 3 illustrates the simplest version of the predictor P: memory $M_2$ contains matrices $\overline{X}(-1)$ relative to the preceding frame, and the predictor performs the operation $\overline{X}(n)=\overline{X}(n-1)+\hat{D}(n)$. The variable length coder VLC and the buffer memory MT operate as in the assembly in FIG. 1, but they work on the quantized predictive error $\hat{D}(n)$.

FIG. 4 is a diagram of an interframe hybrid coder with prediction in the original domain. Hence, predictive coding is applied to the image element blocks x(n) instead of being applied to their transform, as in the assembly in FIG. 3. The perceptive orthogonal transformation T is applied to the predictive error d(n), which is determined by difference between the image element blocks x(n) and a prediction $\hat{x}(n)$ produced by the predictor P. The computer T determines the transform D(n) of the predictive error and this transform is quantized in the quantizer Q. The quantized output $\hat{D}(n)$ activates, first of all, a variable length coder VLC, as in the preceding assemblies, and secondly, an inverse transformation computer $T^{-1}$, which activates the predictor P. It is well known that for equivalent predictors P, the coders in FIGS. 3 and 4 are equivalent. The advantage of the prediction in the original domain, however, is that the predictor P can more readily include the prediction or compensation of movement from frame to frame.

One aspect of the invention consists of integrating certain perceptive properties of human vision into the transform coefficient quantizing operation. The property that is used is the sensitivity of the eye as a function of spatial frequency. Several studies (for example, F. X. J. Lucas and Z. L. Budrikis, "Picture Quality Prediction Based on a Visual Model", IEEE Trans., Vol. COM-30, No. 7, July 1982, pp. 1679-1692) have shown that, with regard to the scene observed, the human eye behaves like a filter in the spatial domain. In this model, it is believed that the information transmitted by the eye to the brain is a filtered version of the scene. The simplest model is a low-pass filter, which means that the sensitivity of the eye decreases when the spatial frequency (in cycles per degree of visual angle) increases. It is true that because of the mechanism of pupil adaptation, the eye is also less sensitive to very low frequencies, but this is not taken into consideration here because it provides few advantages with regard to coding.

Most of the unitary transformations used in image coding techniques, to a certain extent, make a sort of spectral analysis of the image; there is some correspondance, at least qualitative, between the order of the coefficient and the spatial frequency. The transform coefficients, which are the bits of information transmitted, undergo quantization. The reconstructed image is thus affected by noise resulting from the quantization errors of the coefficients. It is rather evident that the quantization error affecting a high order coefficient gives rise, on the restored image, to noise containing relatively high frequencies. Since the sensitivity of the eye diminishes with the frequency, the high order transform coefficients can be coded more grossly.

As a function of this determination, it should be possible to express the subjective degradation due to coding in the form of a sum of quadratic quantization errors $\epsilon_i$ affecting the coefficients of the transform, weighted by weighting factors $W_i^2$ which are dependent on the order of the coefficient. Thus, the subjective degradation is given by an expression with the form:

$$D = \sum_i W_i \epsilon_i^2$$

This equation will be defined below. Consequently, it should be possible to optimize the acceptable quantization errors as a function of the order of the coefficient in order to minimize this subjective degradation. This possibility has not escaped the attention of certain coding specialists. However, the central element in this approach is a correct quantitative determination of the weighting coefficients $W_i$. The solutions proposed for determining these coefficients in the known state of the art are unsatisfactory.

Nill (N. B. Nill, "A Visual Model Weighted Cosine Transform for Image Compression and Quality Assessment", IEEE Trans., Vol. COM-33, No. 6, June 1985, pp. 551-557) attempted to find a solution for discrete cosine transformation. The reasoning held by this author can be summarized briefly as follows. Let $X(v)$ be the Fourier transform of the image and let $H(v)$ be the visual filter transmittance. Also, let $X_c(V)$ be the image cosine transform. Nill tried to find a filter which would act in the field of the cosine transform, and which would be equivalent to the visual filter, but within the domain of cosine transforms. The transmittance $H_c(v)$ of this filter should thus satisfy the equation $H_c(v)X_c(v) = H(v)X(v)$. Obviously, this problem has no correct solution. More precisely, it is found that $H_c(v)$ depends on $X_c(v)$, i.e., on the contents of the image. This is a somewhat aberrant result because it is difficult to imagine that the filtering properties of the eye are different for each image. Moreover, the filter found has a complex "cosine transmittance" $H_c(v)$, which is also aberrant because of the cosine transformation is real. In order to find an approximate solution for this impossible problem, Nill introduced mathematical approximations which are difficult to justify, such as replacing a complex number by its module. Moreover, the quantity $X_c^2(v)$ is replaced by the power spectral density $P(v)$ of the image. This is also difficult to justify, because the latter is a mean quantity over a large number of images. This reasoning, in which several steps are difficult to justify, leads to finding a noise weighting function in the domain of the cosine transform, which therefore depends on the statistical properties postulated for the images. This result is shocking and is the result of unjustified approximations to find a solution to a problem, which as it is posed, has no solution.

Eggerton and Srinath (J. D. Eggerton and M. D. Srinath, "A Visually Weighted Quantization Scheme for Image Bandwidth Compression at Low Data Rates", IEEE Trans., Vol. COM-34, No. 8, August 1986, pp. 840-847) have also attacked this problem. Using an expression of the subjective degradation of the form defined above, these authors tried to determine laws of quantization of coefficients of the DCT, uniform or non-uniform laws, which minimize the degradation, under the constraint of a determined entropy of quantized transformed coefficients. Assuming that the variable length coder has a coding efficiency equal to unity, the entropy represents the bit rate at the output of the variable length coder, and it is thus dependent on the statistical properties postulated for the images. It follows that, just as in Nill's approach, the weighting coefficients $W_i$ depend on these statistical properties.

Although this results from the deliberate choice of minimizing the degradation under the constraint of a fixed entropy, this result is not always desirable. It is even completely undesirable in applications for which we wish to retain some flexibility in the choice of image quality; this is the case, for example, when it is desirable to retain the capability of transmitting still images with a progressively increasing quality as a function of the number of bits transmitted. However, even in the case where the bit rate is fixed by the application in question, this property is not desirable; in fact, it is in opposition to the essential function of the reaction of the buffer memory on the quantizer and to the beneficial effects resulting therefrom, namely, finely coding the images with little detail, and more grossly coding the images containing a great deal of detail.

In addition, it can also be said that the plan of reasoning followed by Eggerton and Srinath in order to determine a visual filter in the domain of frequencies of the DCT is open to a great deal of criticism. In fact, it leads to making the filter different for each one of the image blocks to which the DCT is applied, depending on their position in the image. The authors eliminate this difficulty arbitrarily, by using the filter obtained for a particular block.

Finally, a hypothesis formulated by Eggerton and Srinath concerning the statistical properties of DCT coefficients, namely that they have a probability distribution independent of the order of the coefficient, is unacceptable. It is contrary to reality and leads to the rejection of various advantages of decorrelative coding. It follows, at the very least, that the numerical values obtained for the noise weighting coefficient are inadequate.

Similar criticisms can be formulated concerning Griswold's study (N. C. Griswold, "Perceptual Coding in the Cosine Transform Domain", Optical Engineering, Vol. 19, No. 3, June 1980, pp. 306–311). Here too, considerations that are difficult to justify lead to finding noise weighting coefficients that are dependent on a hypothesis related to the spatial correlation of the images, while they should represent only the perceptive characteristics of the eye.

At present, the embodiment of the perceptive transform according to one aspect of the invention will be described. The description will be for rectangular image blocks comprising $N_1$ points in the vertical direction and $N_2$ points in the horizontal direction. The case of one-dimensional transforms is a special case with $N_1=1$ or $N_2=1$. The distance between the image points, expressed with one unit which is the height of the image is noted $r_1$ in the vertical direction and $r_2$ in the horizontal direction. The image elements of the block considered are noted $x(i_1, i_2)$, with $$0 \leq i_1 \leq N_1-1 \text{ and } 0 \leq I_2 23\ N_2-1.$$

First of all, let us consider a unitary transformation, and let $X(n_1, n_2)$ be the transformed coefficients, with $$0 \leq n_1 \leq N_1-1 \text{ and } 0 \leq n_2 \leq N_2-1.$$

The inverse transformation can be written in the form:

$$x(i_1,i_2) = \sum_{n_1=0}^{N_1-1} \sum_{n_2=0}^{N_2-1} X(n_1,n_2)\, h_{n_1 n_2}(i_1,i_2) \qquad (2)$$

This equation shows that the image block is restored by a summation of $N_1 N_2$ partial images described by $h_{n_1 n_2}(i_1 i_2)$, weighted by the respective transformed coefficients $(X(n_1, n_2))$. These partial images, which are characteristic of the unitary transformation in question, are the basic functions of the latter. In coding diagrams like the ones in FIGS. 1, 3 and 4, the restored image is affected by the quantization error made on the transformed coefficients themselves (case of FIG. 1), or on their predictive errors (case of FIGS. 3 and 4). The quantization noise affecting the image block is given by:

$$\epsilon_x(i_1,i_2) = \sum_{n_1=0}^{N_1-1} \sum_{n_2=0}^{N_2-1} \epsilon_X(n_1,n_2)\, h_{n_1 n_2}(i_1,i_2) \qquad (3)$$

where $\chi(n_1, n_2)$ is the quantization error relative to the coefficient of order $(n_1, n_2)$. Thus, the quantization noise consists in a sum of the basic functions weighted by the quantization errors.

It is interesting to find that most of the unitary transforms used in image coding (DFT, DCT, HT, etc.), besides producing well decorrelated transformed coefficients, also perform a sort of spectral analysis. The increasing transformed coefficients of order $(n_1, n_2)$ and the corresponding basic functions, in fact, represent the contents of the image at high spatial frequencies. It is also known that the sensitivity of the eye decreases with spatial frequency. The effect of a quantization error affecting a high order coefficient produces a concentrated quantization noise at high spatial frequencies, which is only slightly visible. Thus, it is possible to make use of the perceptive properties of the eye while tolerating a larger quantization error on the high order coefficients than on the lower order coefficients. This finding is the basis of the invention.

It is true that one or another proposal for coding the coefficients of a unitary transform as a function of their order can be found in the literature, but these deal only with specific cases. Thus, it has been proposed that non-linear and different quantization laws be used for the coefficients of a 2×2 order Hadamard transform. However, according to the invention, a representative function of the perceptive properties of vision is systematically integrated in the coding process for the expedient of a modified perceptive transformation. In order to do this, we propose below a mathematical formulation for the perception of quantization noise. The demonstration of the relations which will be described is difficult and would exceed the usual scope of the description of an invention. If we note:

(1) v and u are the vertical and horizontal spatial frequencies, respectively, expressed in cycle per image height (c/H), (2) $H_{n_1 n_2}(f_1, f_2)$ the two-dimensional discrete Fourier transformation of the basic function $$h_{n_1 n_2}(i_1, i_2)$$

(3) $\theta_\epsilon^2 X,n_1 n_2$ is the variance of the quantization error affecting the transformed coefficient $X_{n_1 n_2}$, it is possible to show that the quantization noise affecting the restored analog image has a power spectral density given by:

$$\gamma_N(v,u) = \frac{r_1 r_2}{N_1 N_2} \sum_{N_1=0}^{N_1-1} \sum_{n_2=0}^{N_2-1} \sigma^2_{\epsilon X,n_1 n_2} |H_{n_1 n_2}(vr_1, ur_2)|^2 \qquad (4)$$

The noise power could be calculated by integrating this function on the domain $(\pm V_M, \pm u_M)$ of the spatial frequencies. However, a noise power calculated in this manner does not take into account the visibility of the noise as a function of the frequency. The subjective effect of the noise is better represented by first weighting the spectral density of the noise by a function $W(v,u)$ representing the sensitivity of the eye as a function of spatial frequencies. The subjective degradation is then given by the weighted noise power:

$$P_{N,p} = \int_{-v_M}^{v_M} \int_{-u_M}^{u_M} \gamma_N(v,u)\, W(v,u)\, dv\, du \qquad (5)$$

The combination of the two preceding equations leads to the expression of the weighted noise power in the form:

$$P_{N,p} = \sum_{n_1=0}^{N_1-1} \sum_{n_2=0}^{N_2-1} W_{n_1 n_2}\, \sigma^2_{\epsilon X,n_1 n_2} \qquad (6)$$

where the coefficients $W_{n_1 n_2}$, which are called noise weighting coefficients, are given by:

$$W_{n1n2} = \qquad (7)$$

$$\frac{r_1 r_2}{N_1 N_2} \int_{-v_M}^{v_M} \int_{-u_M}^{u_M} |H_{n1n2}(vr_1, ur_2)|^2 W(v,u)\, dv\, du$$

It is possible to show that, for a fixed bit rate at the output of the quantizer, the weighted noise power is minimal when all of the terms of the second member of equation (6) are equal. This means that it is suitable to use different quantizing steps for the transformed coefficients, as a function of their order. More specifically, the quantizing steps of the coefficients of the unitary transform must follow the law:

$$\Delta X_{nnn2} = k/\sqrt{W_{n1n2}} \qquad (8)$$

where k is a constant. The use of different quantizing steps according to the order of the coefficient is, however, not very practical. This is particularly true when this step must be adapted as a function of a variable such as the degree of filling of a buffer memory. The perceptive transformation solves this problem. It consists of a modification of the unitary transform in question, by suitable scaling of the coefficients of the latter; more precisely, the transformed coefficients $Y_{n1n2}$ of the perceptive transform are related to those of the unitary transform by the equation:

$$Y_{n1n2} = X_{n1n2} \sqrt{W_{n1n2}}$$
(9)

It is clear that it is possible to associate a perceptive transformation with any unitary transformation. Thus, within the scope of the invention, it is possible to speak of perceptive DFT, perceptive DCT, perceptive HT, etc.

Of course, as a result of equations (7) to (9), the transforms can only be defined strictly if we know the function W(v,u) which gives the sensitivity of the eye as a function of spatial frequencies. This function is not uniquely defined in the literature. A preferred manner of defining it is proposed below. The scope of the invention will not be exceeded by proposing another function, or even by proposing another value of the weighting coefficients $W_{n1n2}$ which are used for scaling, or even by replacing the multiplication in equation (9) by division by factors which would be the inverse of $\sqrt{W_{n1n2}}$, and which could be called thresholds of visibility of the transformed coefficients.

The preferred manner of defining the function W(u,v) is based on the concept of signal to weighted noise ratio currently used in the field of television, and especially on the weighting curves of noise defined by the CCIR (International Radio Consultation Committee). This preference is justified by the fact that the noise weighting curves adopted by the CCIR are the result of numerous tests and are commonly accepted.

The idea of a weighted signal-to-noise ratio is applied for additive noises to an analog video signale. An additive noise voltage n(t) to a video signal gives rise on the screen, as a function of the characteristics of the scanning system used in television, to noise N(x,y), where x and y are position coordinates. It is thus possible to convert the spectral density $\gamma_n(f_v)$ of the noise n(t) as a function of the video frequency $f_v$ to a spectral density $\gamma_N(v,u)$ of the noise N(x,y) as a function of spatial frequencies. The characteristics of additive video noises to which the CCIR recommendations are applied are the ones that correspond to spectral densities $\gamma_N(v,u)$ independent of v (i.e., to noises that are not correlated from line to line), but which can be any functions of u. In the preferred version, it is necessary that the function W(v,u) give rise to the same weighted noise power as for the weighting of noise accepted by the CCIR as a function of the video frequency. It is then sufficient to impose an additional condition so that the function W(u,v) is defined uniquely. The condition selected is that the isotropy of the eye as a funtion of two spatial frequencies, i.e., that the weighting curve is a function of $\sqrt{u^2+v^2}$. This hypothesis is only an approximation of the actual behavior of the eye and other conditions could be used. A less good approximation of the eye, but one that leads to a simpler embodiment is to accept a separable function: $W(u,v) = W_1(u)W_2(v)$.

It is also necessary to take into consideration that during the historical development, the CCIR has defined different noise weighting curves. The curve that is now accepted, called the unique weighting system, is not suitable, because it was defined for composite NTSC, PAL or SECAM signals, and takes into account the fact that chrominance signals are transposed in the top of the baseband. Since the numerical coding of images applies to the separate components of luminance and color difference, it is preferable to refer to the former curves defined for these components, and for example, to recommendation 461 (Geneva 1974).

The weighting function accepted as a function of video frequency is the same for luminance and for color difference signals, and corresponds to a low pass filter of the first order having a cut-off frequency of 0.482 MHz, the weighting being limited to 5 MHz for luminance and 1.67 MHz for color difference signals. For the sampling format defined by CCIR Recommendation 601 and starting with a DCT transform working on 8×8 blocks, we obtain the coefficients given by Tables 1 and 2.

TABLE 1

Weighting coefficients $W_{n1n2}$ for luminance.

| | | | | | | | |
|---|---|---|---|---|---|---|---|
| 9.9319 | 3.4115 | 1.5038 | 0.7310 | 0.4263 | 0.2387 | 0.0688 | 0.0043 |
| 5.5120 | 2.4201 | 1.2289 | 0.6425 | 0.3848 | 0.2049 | 0.0500 | 0.0027 |
| 3.1932 | 1.7296 | 1.0018 | 0.5667 | 0.3500 | 0.1872 | 0.0444 | 0.0023 |
| 1.7998 | 1.1693 | 0.7694 | 0.4753 | 0.3055 | 0.1575 | 0.0338 | 0.0018 |
| 1.0958 | 0.7981 | 0.5791 | 0.3868 | 0.2565 | 0.1217 | 0.0213 | 0.0012 |
| 0.7450 | 0.5812 | 0.4429 | 0.3115 | 0.2067 | 0.0852 | 0.0116 | 0.0009 |
| 0.5793 | 0.4794 | 0.3783 | 0.2624 | 0.1538 | 0.0486 | 0.0049 | 0.0007 |
| 0.4897 | 0.4215 | 0.3580 | 0.2549 | 0.1103 | 0.0195 | 0.0022 | 0.0004 |

TABLE 2

Weighting coeffcients $W_{n1n2}$ for color differences.

| | | | | | | | |
|---|---|---|---|---|---|---|---|
| 13.1953 | 7.3034 | 4.1971 | 2.1025 | 0.6184 | 0.0607 | 0.0155 | 0.0024 |
| 6.7635 | 4.3520 | 2.8420 | 1.3675 | 0.3066 | 0.0265 | 0.0099 | 0.0012 |
| 3.6300 | 2.6165 | 1.7565 | 0.7232 | 0.1192 | 0.0126 | 0.0048 | 0.0007 |
| 1.5775 | 1.0626 | 0.6191 | 0.1866 | 0.0223 | 0.0041 | 0.0011 | 0.0002 |
| 0.3741 | 0.1772 | 0.0812 | 0.0180 | 0.0024 | 0.0005 | 0.0001 | 0.0000 |
| 0.0347 | 0.0175 | 0.0116 | 0.0048 | 0.0007 | 0.0001 | 0.0000 | 0.0000 |
| 0.0118 | 0.0075 | 0.0039 | 0.0011 | 0.0002 | 0.0000 | 0.0000 | 0.0000 |
| 0.0016 | 0.0009 | 0.0006 | 0.0003 | 0.0000 | 0.0000 | 0.0000 | 0.0000 |

It is clear that according to the principles stated above, different weighting coefficient values are obtained, either for another unitary transform, or for another choice of the weighting function, or even for another sampling format.

With respect to the actual embodiment, calculation of the perceptive transform is generally preferable to the application to coefficients of the unitary transform, of quantizing steps dependent on the order of the coefficients. The use of the same quantizing step for all of the coefficients actually makes adaptation of this step easier as a function of a quantity such as the filling status of a buffer memory. The calculation of the perceptive trnasform can also be carried out in two ways. Matrix multipliers can be used. It is also possible to calculate, first of all, the corresponding unitary transform, and then to multiply the transformed coefficients by $\sqrt{W_{n1n2}}$. This second method, in which a rapid calculation algorithm would be used for the unitary transform, reduces the number of multiplications to be performed.

By examining Tables 1 and 2, it can be noted that the weighting coefficients $W_{n1n2}$ are low for high orders. Consequently, the high order transformed coefficients are notably smaller for the perceptive transform than for the corresponding unitary transform, for the same weighted quantization noise power. Therefore, a greater reduction of the bit rate is obtained. In particular, in a block by block redundancy reduction coding, with a scanning path such as the one shown in FIG. 2, it is probable that long null coefficient sequences will be found, which contributes a great deal to the reduction of the bit rate, particularly in hybrid coders.

The other aspect of the invention will now be described, which consists of scanning sets of coefficients of the same order, taken in a group of blocks, and designed to increase the efficiency of the redundancy reducing code, and to make it independent of the image statistics. Although the maximum advantages can be obtained when this method is used with a perceptive transform, this aspect of the invention can also be applied to a known unitary transformation.

In an exemplary mode of embodiment, it is assumed that the size of the blocks is $8 \times 8$, and that the sampling format is the one in CCIR Recommendation 601, for which there are 720 luminance samples in the active part of an image line. A set of eight image lines then leads to 90 blocks. The redundancy reducing processing can be applied to these groups of blocks, rather than to each block separately. In order to do this, the coding diagrams shown in FIGS. 1, 3 and 4 are modified as indicated in FIG. 5. The sixty-four transformed and quantized coefficients of each of the 90 blocks are ranked in a memory $M_3$ before being applied to the variable length coder VLC. The memory $M_3$ is organized in 64 lines and 90 columns as illustrated schematically in FIG. 6. The binary signals representing the transformed and quantized coefficients of one block are ranked in each column in increasing order. The contents of the memory $M_3$ can be analyzed line by line as indicated symbolically by the dotted lines in FIG. 6. It is obvious that the scanning then concerns long series of coefficients obeying the same statistical law, which are certainly dependent on the order of the coefficient. This statistical stability permits the use of more efficient codes than when coding with a series of coefficients obeying different laws, as is the case when the series of coefficients of a block is scanned according to a diagram as shown in FIG. 2. In particular, it is possible to take advantage of the very long sequences of null coefficients that are found when high order coefficients are scanned.

In the aforementioned coefficient by coefficient scanning process, the occurrence of a not null coefficient, even though it is very small, interrupts the zero sequences. An improvement can be obtained by scanning the contents of the $M_3$ memory bit by bit. According to this method, the most significant bits (MSB) of the coefficients are read line by line, then the bits of the immediately lower order (2MSB), and so on. This scanning process offers the advantage that a not null coefficient, even though it is very small, does not interrupt the zero sequences before the low order bits are reached.

However, it is possible to take full advantage of the contents of the bit by bit memory $M_3$ only when universal codes are used. The aforementioned memory $M_3$ in which the transformed coefficients $X_{n1n2}$ are stored before being sent to the VLC coder (FIG. 5) is organized on several levels such as B1, B2 ... B90, as shown in FIG. 7 and the signals representing the transformed coefficients corresponding to a block are ranked in each level. In each level, the line number corresponds to the order of the transformed coefficient (varying from 1 to 64 for blocks measuring $8 \times 8$), while the column number increases as a function of the order of the bits from the most significant bit (MSB) to the least significant bit (LSB). The form of the levels represented in FIG. 7 corresponds to an enumeration of the transformed coefficients according to an order such as illustrated in FIG. 2. Some most significant bits with a high order coefficient are routinely null because the weighted coefficients decrease with spatial frequency. These most significant bits (MSB) which are routinely null are not shown in FIG. 7.

According to the invention, the contents of memory $M_3$ is read such that the signals applied to the VLC redundancy reducing coder include sets of bits belonging to transformed coefficients of the same order taken from a group of blocks, the bits of each coefficient in the same set being taken in a separate block belonging to said group of blocks. In the exemplary case of a group of 90 blocks, which corresponds to eight image lines in the format according to CCIR Recommendation 601, each binary word applied to the redundancy reducing coder is thus made up of bits of a specific order with a specific coefficient of order such as the bits noted b1, b2, ... b90 in FIG. 7. In such a word, which is composed according to the scanning technique according to the invention, it is possible to assume that these bits are independent of one another and that the probabilities $p_0$ and $p_1 = 1 - p_0$ that these bits take, the values 0 or 1, are constant within the word, although they are dependent on the column and line numbers.

Universal codes, the principle of which is known in itself (for example, Lynch, Davisson, Schalkwijk, Tanaka and Leon-Garcia and others), are redundancy reducing codes that are applied to long words of N binary digits that are independent of one another, and have probabilities $p_0$ and $p_1$ independent of the position of the digit. They are called universal because the coding efficiency is very high within a very broad range of probability $p_1$, for example, between 0.001 and 0.999. The universal character of these codes means that the same code can be used for all of the binary words in an analysis method as illustrated in FIG. 7. The principal advantage of universal codes, in contrast to codes such as the Huffmann codes, is that within the context considered here, they ensure greater efficiency regardless of the statistical properties of the images.

This property explains why, within the context of the invention, it is necessary to define the noise weighting coefficients $W_{n1n2}$ independently of any image statistics. In fact, the universal codes are effective regardless of these statistics.

Although the principle of universal codes is known in itself, these codes can be further refined in order to increase their efficiency and their utility in a specific application. It was assumed above that a binary word of specific length N was presented at the input of the VLC coder which transforms it by the coder to a variable length word, according to the number of digits 1 contained in the input word. Another version of universal codes transforms input words of variable length N into output words of fixed length; this type of universal code is more appropriate for systems that operated according to a mode of transmission by packets.

The adequate combination of the bit by bit scanning process and perceptive transformation, according to the invention, presents still other advantages. It is assumed that binary writing of transformed coefficients into the memory $M_3$ is in a code such that an increasingly fine quantization corresponds to bits of decreasing order. This can be achieved by using a binary code similar to the Gray code.

The definition of perceptive transformation is such that, under these conditions, the columns in FIG. 7 correspond to increasing image qualities, when the table is read from left to right. More precisely, stopping the scanning at a given column corresponds to a specific weighted signal-to-noise ratio. However, in practice, because the high order coefficients are statistically insignificant, the column by column scanning also gives rise to progressive restoration of details, which is similar to an increase in the definition of the image. Finally, in mixed intra-frame and hybrid coders, universal codes are suitable for coding groups of blocks including both intra-frame blocks and blocks of predictive errors.

These properties of progression of the image quality are very advantageous in several applications. For a television transmission circuit with a fixed bit rate, the regulation of the bit rate by reaction of the buffer memory MT on the quantizer, amounts to deciding the column at which the variable length coder interrupts the process of scanning the memory $M_3$, and the coding efficiency is ensured automatically, without it being necessary to use Huffman codes adapted to each quantization fineness. In a packet transmission system, such control is generally not present and the column at which the scanning process is interrupted is the result of a preselection which determines the quality of the image; thus a simple means of modifying the latter is available. Furthermore, for still images, by carrying out this scanning for the entire image, rather than on a limited number of blocks, the latter is transmitted progressively; this progression is considered to be an important quality for systems for transmitting or storing still images.

The coding process according to the invention can be applied within a vast range of applications. It is also suitable for conventional television and for high definition television, as well as for video conference and TV-telephony systems. It has also been shown that it is applicable both to intra-frame processing and to inter-frame hybrid processing. It is also suitable for transmitting and storing still images. Of course, the parameters of the process must be adapted to each type of application. It is particularly suitable to adapt the different weighting coefficients to the scanning and sampling format of the image, and possibly as a funtion of the distance from the observer to the screen. The scope of the invention would not be exceeded by approximating the multiplicative factors $\sqrt{W_{n1n2}}$ permitting transformation of the unitary transformation coefficients to those of perceptive transformation by powers of two; this approximation makes it possible to replace the multiplications by shifts of binary digits, or even not to make these shifts, but to analyze the bits of the unitary transformation coefficients in a corresponding order, as a matter of fact, using perceptive transformation.

What is claimed is:

1. A method of coding video signals comprising:
   reading data relative to a a still or moving video image in successive blocks;
   subjecting the data to orthogonal transformation;
   quantizing the transformed coefficients;
   storing by rank signals representing the coefficients in organized blocks of memory;
   retrieving from memory signals representing the coefficients in groups of blocks, in a predetermined scanning order, the signals of each coefficient in each set being taken in a separate block belonging to said group of blocks; and
   applying the coefficients of the transformation in the form of binary signals to a variable length coder.

2. Process according to claim 1, characterized in that the orthogonal transformation (T) is such that each one of the transformed coefficients ($Y_{n1n2}$) of the transform is obtained by multiplying the transformed coefficients ($X_{n1n2}$) of a unitary transform known of itself by factors ($\sqrt{W_{n1n2}}$) such that the quantization noise power weighted by the sensitivity of the eye as a function of spatial frequencies is minimal, this weighting being carried out independently of the statistical properties of the images.

3. Process according to claims 1 or 2, characterized in that said scanning by groups of blocks of coefficients of said perceptive transformation is carried out in such a manner as to obtain a progressively increasing quality of the coded image.

4. Process according to Claims 1 or 2, characterized in that said orthogonal transformation is applied to blocks of image elements taken in the same frame or in different frames.

5. Process according to Claims 1 or 2, characterized in that said orthogonal transformation and said scanning are applied to the predictive error determined in a known manner in a hybrid coder.

6. Process according to Claims 1 or 2, characterized in that said scanning is applied to groups of blocks comprising both image element blocks and predictive error blocks.

7. Process according to Claims 1 or 2, characterized in that said scanning presents to the redundancy reducing coder sets of bits, each bit in a set belonging to a coefficient taken in a separate block of a group of blocks.

8. Process according to Claims 1 or 2, characterized in that the perceptive transform is calculated by means of a matrix multiplier.

9. A method of coding video signals comprising:
   reading data relative to a still or moving video image in successive blocks;
   subjecting the data to orthogonal transformation;
   quantizing the coefficients of the transformation; and
   applying the coefficients of the transformation to a redundancy reducing coder;
   wherein each one of the transformed coefficients ($Y_{n1n2}$) of the transformation is obtained by multiplying the transformed coefficients ($X_{n1n2}$) of a unitary transformation known in itself by factors ($\sqrt{W_{n1n2}}$) such that the quantization noise power weighted by the sensitivity of the eye as a function of the spatial frequencies is minimal, said weighting being carried out independently of the statistical properties of the images.

10. Process according to Claim 9 in which the noise weighting coefficients $W_{n_1n_2}$ are used to define a weighted quantization noise power given by the formula $$P_{N,p} = \sum_{n_1=0}^{N_1-1} \sum_{n_2=0}^{N_2-1} W_{n_1n_2} \sigma^2_{ex,n_1n_2}$$

where $\sigma^2_{ex,n_1n_2}$ is the variance of the quantization error affecting the transformed coefficient $X_{n_1n_2}$ of the unitary transformation, characterized in that the weighting coefficients are related to a function W(u,v), expressing the sensitivity of the eye as a function of spatial frequencies u and v in cycles per height of image, by the relation $$W_{n_1n_2} = \frac{r_1r_2}{N_1N_2} \int_{-v_M}^{v_M} \int_{-u_M}^{u_M} |H_{n_1n_2}(vr_1,ur_2)|^2 W(u,v) du\, dv$$

where $r_1$ and $r_2$ are the geometric dimensions of a block and $H_{n_1n_2}$ is the discrete Fourier transform of the basic order function ($n_1n_2$) of the unitary transformation.

* * * * *